United States Patent [19]

Chigusa et al.

[11] Patent Number: 5,075,008

[45] Date of Patent: Dec. 24, 1991

[54] PROCESS FOR HIGH-LOAD TREATMENT OF CARBOHYDRATE CONTAINING WASTE WATER

[75] Inventors: Kaoru Chigusa; Michiyo Matsumaru, both of Tokyo, Japan

[73] Assignee: Research Association of Biotechnology for Organic Fertilizer, Tokyo, Japan

[21] Appl. No.: 671,664

[22] Filed: Mar. 20, 1991

Related U.S. Application Data

[63] Continuation of Ser. No. 422,676, Oct. 17, 1989, abandoned.

[51] Int. Cl.$^5$ .............................................. C02F 3/34
[52] U.S. Cl. .................................. 210/610; 210/622; 210/624; 210/631; 210/754; 210/764
[58] Field of Search ............ 210/610, 611, 623, 631, 210/759, 606, 607, 614, 622, 624, 625, 754, 756, 760–763, 626, 764, 765

[56] References Cited

U.S. PATENT DOCUMENTS

| | | | |
|---|---|---|---|
| 3,705,098 | 12/1972 | Shepherd et al. | 210/759 |
| 3,801,499 | 4/1974 | Luck | 210/611 X |
| 4,044,500 | 8/1977 | Hitzman | 210/611 X |
| 4,183,807 | 1/1980 | Yoshizawa et al. | 210/611 |
| 4,211,645 | 7/1980 | Zajic et al. | 210/611 |
| 4,321,143 | 3/1982 | Wilms et al. | 210/759 |
| 4,371,440 | 2/1983 | Yoshizawa et al. | 210/611 X |

*Primary Examiner*—Thomas Wyse
*Attorney, Agent, or Firm*—Whitham & Marhoefer

[57] ABSTRACT

A process for high-load treatment of carbohydrate-containing waste water comprises the steps of separating a yeast appearing in the waste water, subjecting the separated yeast to large-quantity culture, and treating the waste water by a high-load operation using the cultured yeast as a seed fungus under the conditions of a volume load of 10 to 80 kg-BOD/m$^3$·day and a yeast load of 1.0 to 5.0 kg-BOD/kg-yeast·day, whereby it is possible to treat the high-concentration waste water efficiently with a small volume for treatment. To obviate the conflict between the yeast and bacteria, it is recommendable to add Cl$_2$ to a reservoir in an amount of 10 to 50 mg/l. Upon the treatment of the waste water, a surplus of yeast is generated, which contains proteins and vitamins in high contents and, therefore, is capable of being taken by a fodder company as fodder or fertilizer; thus, the disposal cost associated with the surplus yeast is saved.

5 Claims, 2 Drawing Sheets

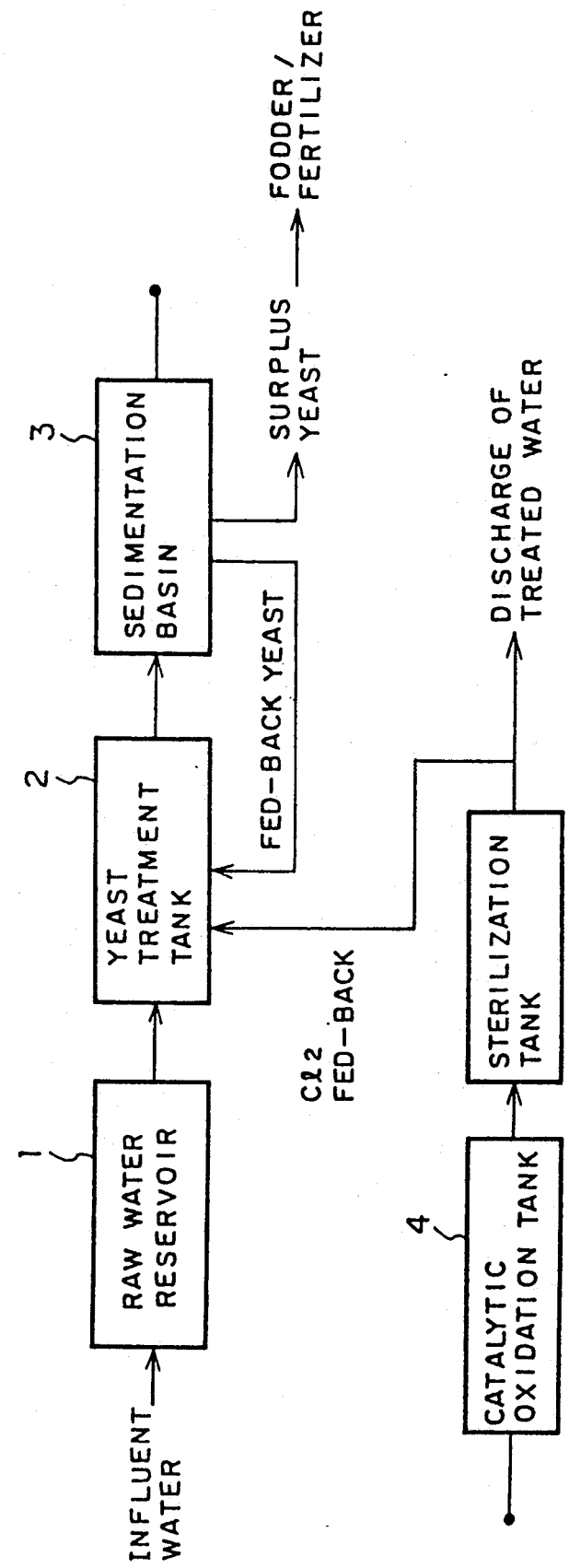

PROCESS FOR HIGH-LOAD TREATMENT OF CARBOHYDRATE CONTAINING WASTE WATER

This application is a continuation of U.S. Pat. Ser. No. 422,670, filed Oct. 17, 1989, now abandoned.

BACKGROUND OF THE INVENTION

(1) Field of the Invention

This invention relates to a process for high-load treatment of carbohydrate-containing waste water by utilizing a yeast appearing in the waste water, with a higher efficiency as compared to conventional methods.

(2) Description of the Prior Art

As an example of conventional methods for waste water treatment, there has been a method of treating an inflow of sewage with an activated sludge in an aerator.

Since the activated sludge in the aerator is composed mainly of bacteria a large amount of sludge is formed upon the treatment. A surplus of sludge is incinerated in most cases, through it is sometimes converted into fertilizer by composting.

The conventional sewage treatment method by the activated sludge requires a large-scale treatment plant, with a great site area, as well as a high construction cost inclusive of that for incineration of sludge. Besides, the conventional method involves heavy expenses for electric power supplied to a diffuser, for maintenance such as disposal associated with sludge incineration, etc.

SUMMARY OF THE INVENTION

This invention contemplates overcoming the above-mentioned drawbacks of the prior art.

It is an object of this invention to provide a process of high-load treatment of carbohydrate-containing waste water which comprises the steps of propagating a yeast appearing in the waste water, and treating the waste water by a high-load operation using the propagated yeast, which promises an increase in the efficiency of a plant for treatment of carbohydrate-containing waste water, and which enables the yeast used for the waste water treatment to be subsequently utilized as fodder or fertilizer, thereby achieving a corresponding saving in the cost for disposal, such as incineration.

The process for high-load treatment of carbohydrate-containing waste water according to this invention comprises the steps of separating a yeast appearing in the waste water, subjecting the separated yeast to large-quantity culture, and treating the waste water by a high-load operation using the cultured yeast as a seed fungus under the following conditions:

| | |
|---|---|
| volume load: | 10 to 80 kg-BOD/m$^3$ · day, |
| yeast load: | 1.0 to 5.0 kg-BOD/kg-yeast · day, |
| pH: | up to 5.0, and |
| Cl$_2$ addition: | 10 to 50 mg/l. |

Other objects and advantages of this invention will become apparent from the following detailed description of some preferred embodiments of the invention, referring to the accompanying drawings.

BRIEF DESCRIPTION OF THE DRAWINGS

FIG. 3 is a flow sheet showing a device for treatment of carbohydrate-containing waste water according to another embodiment of the invention.

PREFERRED EMBODIMENTS OF THE INVENTION

As one preferred embodiment of this invention, an experimental example of a treatment with yeast of waste water from a bakery will now be explained below.

Figure 1:
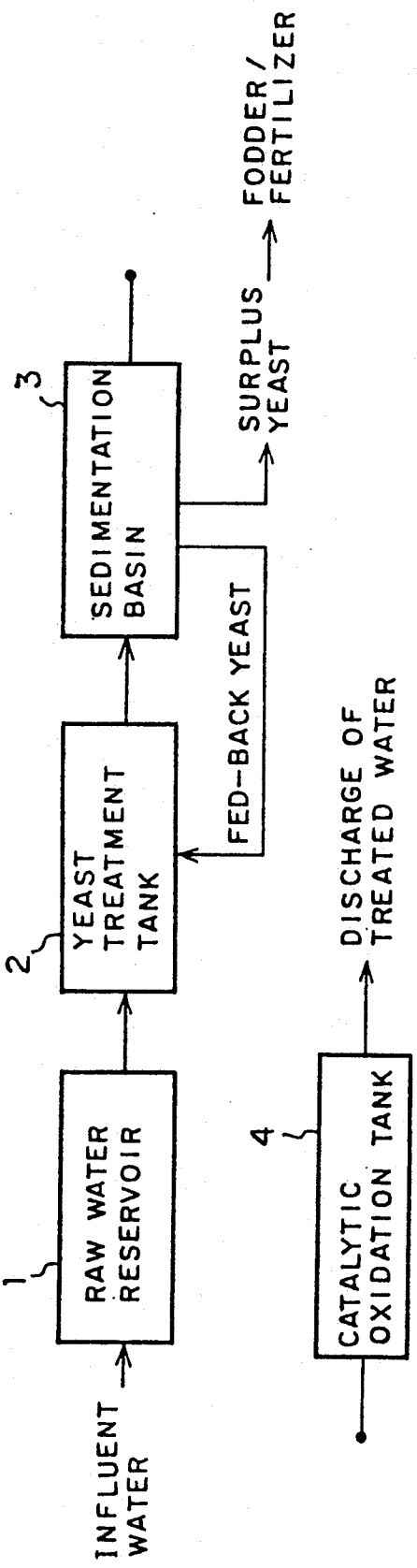
FIG. 1 is a flow sheet showing a device for treatment of carbohydrate-containing waste water according to one embodiment of this invention.

Referring to FIG. 1, there is shown a flow sheet of a device for treatment of carbohydrate-containing waste water used in the experiment of this invention. In the figure, a raw water reservoir 1 is fed with the carbohydrate-containing waste water, whereas a yeast treatment tank 2 is provided for treating the waste water fed from the raw water reservoir 1 (serving also for production of yeast), and a sedimentation basin 3 is provided or sedimentation of a mixed liquid transferred from the yeast treatment tank 2. The sedimentation basin 3 is so designed that it is possible to transfer the supernatant therefrom into a catalytic oxidation tank 4, described later, return the sedimented yeast therefrom into the yeast treatment tank 2, and to withdraw a surplus of yeast therefrom. The separation between the yeast and the supernatant may be carried out by any of gravity separation in the sedimentation basin 3, centrifugation, film separation, etc. The catalytic oxidation tank 4, as an after-treatment device, is provided for treating the substrates in the waste water which have not been removed by the treatment in the yeast treatment tank 2. The after-treatment tank, also, may be based on the activated sludge method or coagulating sedimentation, as required.

The species of fungi associated with the yeast treatment belonged mainly to the genus Trichorsporon and the genus Saccharomyces.

The yeast treatment tank 2 was operated under the following conditions:

| | |
|---|---|
| (1) Volume load: | 25 kg-BOD/m$^3$ · day |
| (2) Yeast load: | 1.25 to 2.5 kg-BOD/kg-yeast · day |
| (3) Yeast concentration: | 10000 to 20000 mg/l |
| (4) Quantity of O$_2$ required: | 0.20 to 0.6 kg-O$_2$/kg-BOD-removed |
| (5) Residence time (HRT): | 2.5 hr |
| (6) DO: | 0.1 to 0.5 mg/l |
| (7) pH: | 3.0 to 4.0 |
| (8) SRT: | 10 to 20 days. |

When heavy propagation of bacteria occurred in the yeast tank, sodium hypochlorite was added to the yeast tank for sterilization. In that case, the Cl$_2$ concentration in the tank was set to 20 to 50 mg/l. When the raw water contained a large amount of SS (suspended solid) components, namely, the bacteria propagated in the raw water reservoir and solids, H$_2$SO$_4$ was added to the raw water reservoir shown in FIG. 1 so as to obtain a pH of about 2.0, and Cl$_2$ was added in the above-mentioned amount of 20 to 50 mg/l, to achieve solubilization of the SS components and sterilization, thereby enabling the reactions in the yeast tank to proceed smoothly.

Upon the treatment of the carbohydrate-containing waste water with the yeast under the above-mentioned specified conditions, the properties of the effluent from the yeast treatment tank 2 (the supernatent in the sedimentation basin 3) were measured, the results being shown in the following table.

TABLE

|  | CODcr mg/l | BOD mg/l | T-N mg/l | T-P mg/l | n-HEX extracts | pH | C/N ratio |
|---|---|---|---|---|---|---|---|
| Influent water | 3800 | 2600 | 75 | 48 | 138 | 4.3 | 19 |
| Effluent water | 830 | 330 | 15 | 34 | 9 | less than 5.0 | |
| Removal rate | 78% | 87% | 80% | 29% | 93% | | |

Figure 2:
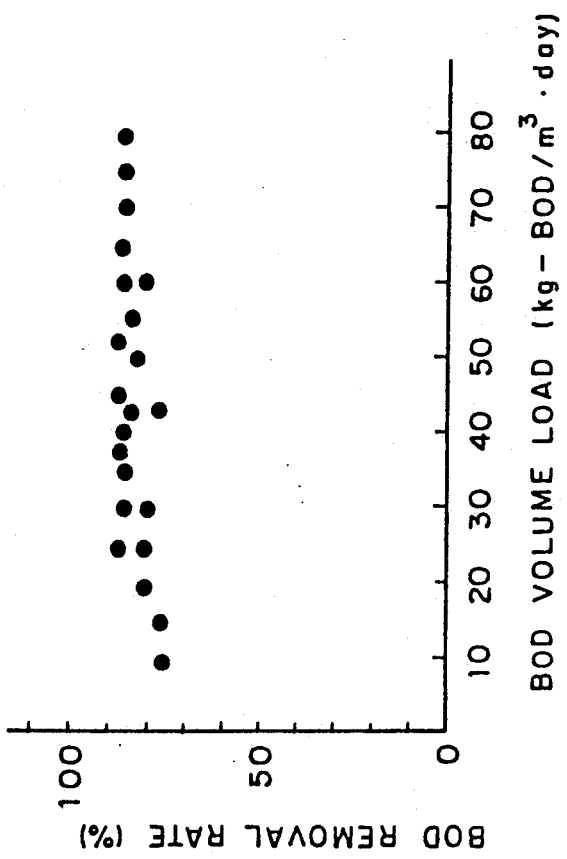
FIG. 2 is a diagram showing the relationship between BOD (Biochemical Oxygen Demand) volume load and BOD removal rate, for proving the stability of the process according to the invention.

Besides, for proving the stability of operation of the yeast treatment tank 2, the relationship between BOD volume load and BOD removal rate based on the above results of waste water treatment is shown in FIG. 2.

Further, when the yeast treatment tank 2 is used as a pre-treatment device, the characteristics of the yeast enable a high-load treatment of waste water even if the waste water contains normal-hexane (n-HEX) extracts, highly salty substrates, antibiotics, etc., by using a reduced quantity of air and a small volume for treatment, similarly to the above. This point distinguishes the process of this invention from the activated sludge method employing bacteria.

Namely, the experiment of the invention gas a BOD removal rate of 87% under a volume load of 25 kg-BOD/m$^3$·day, with a surplus of capability. Moreover, the quantity of oxygen required is small, and under 25 kg-BOD/m$^3$ was 0.2 kg-O$_2$/kg-BOD removed. Besides, the ratio of air quantity to the quantity of BOD removed has a tendency to decrease with an increase in the load, and the process of the invention is good in stability.

The above results shows that the yeast treatment tank 2 is best suited for use as a pre-treatment device for removing at least 80% of the BOD.

Further, the surplus yeast withdrawn from the sedimentation basin 3 is capable of being utilized effectively as fertilizer or fodder, because of its high protein and vitamine contents, and sludge incineration cost is saved accordingly.

Based on the experimental results above, in this invention the operating conditions of the yeast treatment tank 2 have been specified as follows:

| | |
|---|---|
| volume load: | 10 to 80 kg-BOD/m$^3$ · day, and |
| yeast load: | 1.0 to 5.0 kg-BOD/kg-yeast · day. |

The reason for the necessity of the high loads is that a yeast load below 0.5 kg-BOD/kg-yeast-day causes autolysis, and a low yeast load below 1.0 kg-BOD/kg-yeast-day causes the yeast to tend to conflict with bacteria (activated sludge; and, as a result, be defeated by the bacteria. The range of yeast load in which the yeast is capable of serving for the intended treatment without being defeated by the bacteria is 1.0 to 5.0 kg-B0D/kg-yeast-day; the yeast load, when multiplied by the yeast concentration, gives a volume load value of 10 to 80 kg-BOD/m$^3$·day. When the yeast load is more than 5.0 kg-BOD/kg-yeast-day, the quantity of oxygen is the rate-determining factor, so that it is impossible to achieve a BOD removal rate of at least 80%. Though it seems that the volume load may take any value that satisfies the above-mentioned conditions, a volume load of 80 kg-BOD/m$^3$·day with a yeast load of 5 kg-BOD/kg-yeast-day corresponds to a required yeast concentration of 16000 mg/l, and agitation is considered to be the rate-determining factor at yeast concentrations above the value.

FIG. 3 illustrates another embodiment of this invention. A catalytic oxidation tank 4 used in this embodiment is an after treatment device for treating the supernatant sent from the sedimentation basin 3 after the yeast treatment. The treated water obtained upon the treatment in the catalytic oxidation tank is sterilized before being discharged. The sterilized water is fed back into the yeast treatment tank 2.

The feed-back of the sterilized water into the yeast treatment tank 2 is adopted as a measure to cope with the penetration, if any, of bacteria into the system, in consideration of the fact that the yeast is mold and is, therefore, resistant to Cl$_2$. The yeast, being mold, is resistant also to normal-hexane extracts and antibiotics.

As has been described above, according to this invention, a yeast appearing in a carbohydrate-containing waste water is utilized to perform a high-load treatment of the waste water under specified conditions. This process makes it possible to perform the high-load treatment of the waste water efficiently by using an extremely small volume for treatment and a reduced quantity of air, even if the waste water contains normal-hexane extracts, highly salty substrates, antibiotics, etc.. Thus, the process according to this invention is highly economical to carry out. In addition, the process of the invention enables the surplus yeast to be utilized effectively as fertilizer or fodder. Moreover, by the process of the invention, the surplus of sludge which is removed from the after-treatment device is capable of being reduced to a very low value of less than 20% based on that in the conventional activated sludge method.

What is claimed is:

1. A process for high-load treatment of predominantly carbohydrate-containing waste water which comprises the steps of:

separating a yeast appearing in predominantly carbohydrate containing waste water which yeast is capable of conducting an oxidation reaction under high load and capable of gravitational sedimentation in a sedimentation tank;

subjecting the separated yeast to large-quantity culture;

treating the waste water in a yeast treatment tank by a high load operation using the cultured yeast as a seed fungus;

transporting a portion of the waste water to a sedimentation basin where said yeast forms a sediment at the bottom of said sedimentation basin under gravitational forces;

returning a portion of said sediment from said sedimentation basin to said yeast treatment tank to be used in said step of treating the waste water by a high load operation;

transporting a supernatant from said sedimentation basin to a catalytic oxidation tank; and subjecting said supernatant to catalytic oxidation to produce treated water.

2. A process as recited in claim 1 wherein said portion of said sediment returned to said yeast treatment tank is selected to maintain a BOD yeast load between 1.0 kg-BOD/kg-yeast·day and 5.0 kg-BOD/kg-yeast·day and a BOD volume load between 10 kg BOD/m$^3$·day and 80 kg BOD/m$^3$·day in said yeast treatment tank.

3. A process as recited in claim 2 further comprising the step of adding a suitable amount of chlorine to said yeast treatment tank to reduce the propagation of bacteria in said yeast treatment tank.

4. A process as recited in claim 3 wherein said suitable amount of chlorine ranges between 20 and 40 milligrams per liter.

5. A process as recited in claim 1 further comprising the steps of:
sterilizing said treated water with chlorine; and
returning a portion of said treated water to said yeast treatment tank, said returned portion of sterilized and treated water reducing the propagation of bacteria in said yeast treatment tank.

* * * * *